No. 841,914. PATENTED JAN. 22, 1907.
A. ANDREWS & L. M. GALLIHER.
CABLE HOLDING CLIP.
APPLICATION FILED NOV. 3, 1906.
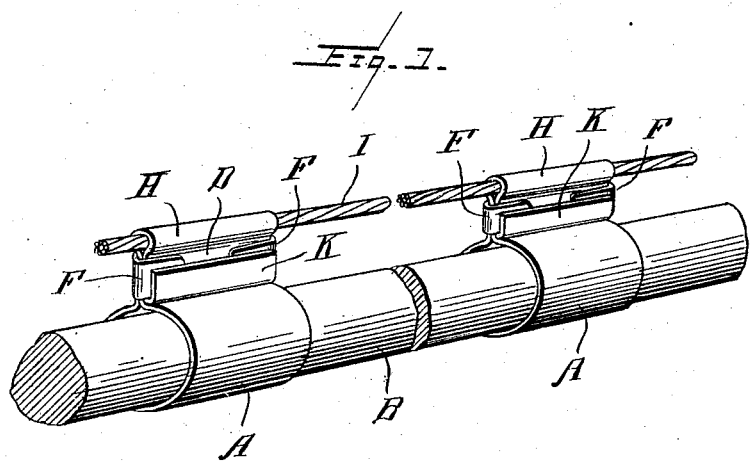
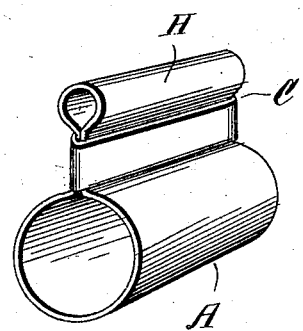
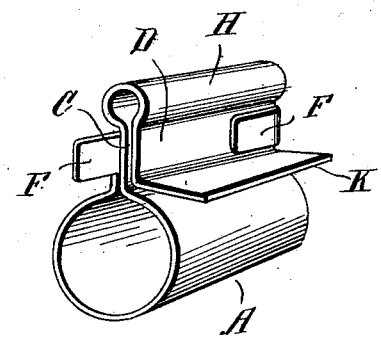
WITNESSES:
INVENTORS
Augustus Andrews & L. M. Galliher
BY Franklin H. Hough
Attorney

UNITED STATES PATENT OFFICE.

AUGUSTUS ANDREWS, OF GULFPORT, MISSISSIPPI, AND LAWRENCE M. GALLIHER, OF NEW ORLEANS, LOUISIANA.

CABLE-HOLDING CLIP.

No. 841,914.　　　　　Specification of Letters Patent.　　　　Patented Jan. 22, 1907.

Application filed November 3, 1906. Serial No. 341,954.

*To all whom it may concern:*

Be it known that we, AUGUSTUS ANDREWS, residing at Gulfport, Harrison county, Mississippi, and LAWRENCE M. GALLIHER, residing at New Orleans, in the parish of Orleans and State of Louisiana, citizens of the United States, have invented certain new and useful Improvements in Cable-Holding Clips; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in clips for holding telephone and telegraph cables to messenger-wires, and comprises a simple and efficient means whereby the cable may be conveniently supported, and comprises various details of construction and arrangements of parts, which will be hereinafter fully described, and then specifically defined in the appended claims.

We illustrate our invention in the accompanying drawings, in which—

Figure 1 is a perspective view showing our invention as applied to a messenger wire and cable. Fig. 2 is a perspective view of one of the clamping members, and Fig. 3 is a detail view showing the manner of bending the lugs upon the clamping device to hold the parts together.

Reference now being had to the details of the drawings by letter, A designates a clamping device which is made of a single piece of metal which is bent to form a cylindrical portion adapted to embrace a cable B. A portion of said plate is bent flat, as at C, and against which the flattened portion D of the plate is adapted to be held.

Lugs F project from one end of the plate and are adapted to be bent over the two flattened portions of the shell, as shown clearly in the drawings, thereby securely clamping the parts together. A cylindrical portion H is formed in the clip to receive the cable I and is of sufficient size to allow the cable to move freely therein.

After the lugs F have been bent about the ends of the two flattened portions the end K of the plate is bent up against the lugs, thereby securely holding the latter in locked relation.

It will thus be seen from the foregoing that by the provision of the apparatus shown and described a simple and efficient means is provided for securely holding the parts of the shell in the positions shown to the cables.

What we claim is—

1. A clamping-plate designed to embrace a cable and bent to form a shell, lugs projecting from one end of the plate and adapted to engage over the ends of the flattened portions of the plate, and means for holding said lugs in locking relation, as set forth.

2. A clamping-plate designed to embrace a cable and bent to form a shell, lugs projecting from one end of the plate and adapted to engage over the ends of flattened portions of the plate, one end of the plate adapted to be bent upon itself and against the bent lugs, as set forth.

3. A clamping-plate which is bent to form a cylindrical shell and provided with laterally-projecting lugs at one end thereof, the shank portion of said plate being bent to form a cable-engaging portion with flattened parts which are adapted to be clamped together by said lugs, the end of the plate being designed to engage said lugs to hold the same in locked relation, as set forth.

In testimony whereof we hereunto affix our signatures in the presence of two witnesses.

AUGUSTUS ANDREWS.
　　　　　　　　LAWRENCE M. GALLIHER.

Witnesses:
　　LOUIS P. BRYANT,
　　GEO. A. DARBY.